United States Patent
Lisch

(10) Patent No.: US 11,498,256 B2
(45) Date of Patent: Nov. 15, 2022

(54) PORTABLE MODULE FOR CONTAINER FORMING AND FILLING SYSTEM

(71) Applicant: AMCOR RIGID PACKAGING USA, LLC, Ann Arbor, MI (US)

(72) Inventor: G. David Lisch, Jackson, MI (US)

(73) Assignee: LiquiForm Group LLC, Saline, MI (US)

( * ) Notice: Subject to any disclaimer, the term of this patent is extended or adjusted under 35 U.S.C. 154(b) by 124 days.

(21) Appl. No.: 16/500,114

(22) PCT Filed: Apr. 26, 2017

(86) PCT No.: PCT/US2017/029629
§ 371 (c)(1),
(2) Date: Oct. 2, 2019

(87) PCT Pub. No.: WO2018/199940
PCT Pub. Date: Nov. 1, 2018

(65) Prior Publication Data
US 2021/0107204 A1    Apr. 15, 2021

(51) Int. Cl.
*B29C 49/06* (2006.01)
*B29C 49/46* (2006.01)
(Continued)

(52) U.S. Cl.
CPC .............. *B29C 49/06* (2013.01); *B29C 49/46* (2013.01); *B29K 2067/003* (2013.01); *B29L 2031/7158* (2013.01); *B65B 3/022* (2013.01)

(58) Field of Classification Search
CPC ......... B29C 49/06; B29C 49/46; B29C 49/12; B29C 49/58; B29K 2067/003; B29L 2031/7158; B65B 3/022; B29D 22/00
See application file for complete search history.

(56) References Cited

U.S. PATENT DOCUMENTS 5,674,741 A  *  10/1997  Watanabe ............. B29C 66/818
                                                    435/283.1
5,707,212 A  *   1/1998  Matthews ................. B65B 3/32
                                                      417/415
(Continued)

FOREIGN PATENT DOCUMENTS

EP          0728667      *   2/1995   ............. B65B 39/00
EP          0728667 A1       8/1996
(Continued)

OTHER PUBLICATIONS

Extended European Search Report issued in corresponding European Patent Application No. 17908059.3 dated Oct. 2, 2020 (7 pages).
(Continued)

*Primary Examiner* — Jeffrey M Wollschlager
*Assistant Examiner* — Shibin Liang
(74) *Attorney, Agent, or Firm* — Eric J. Sosenko; Joseph P. O'Brien; Honigman LLP

(57) ABSTRACT

A portable module for a container forming and filling system. The portable module includes a control module, an operator interface, a pump, connectors, and a transport member. The pump is configured to pump liquid for forming the container and filling the container into a container forming and filling machine. The connectors are for connecting the portable module to the container forming and filling machine. The transport member is for moving the portable module.

13 Claims, 6 Drawing Sheets

(51) Int. Cl.
　　　*B29K 67/00*　　　(2006.01)
　　　*B29L 31/00*　　　(2006.01)
　　　*B65B 3/02*　　　(2006.01)

(56) References Cited

U.S. PATENT DOCUMENTS

| | | |
|---|---|---|
| 9,010,073 B2 | 4/2015 | Stamm Kristensen et al. |
| 2008/0029928 A1 | 2/2008 | Andison et al. |
| 2011/0300249 A1 | 12/2011 | Andison et al. |
| 2012/0151877 A1 | 6/2012 | Stamm Kristensen et al. |
| 2014/0079839 A1 | 3/2014 | Finger et al. |
| 2014/0290791 A1* | 10/2014 | Isom ................. F17C 5/00 141/4 |
| 2015/0290082 A1 | 10/2015 | Haenggi et al. |
| 2015/0328824 A1* | 11/2015 | Morikami ............ B29C 49/12 425/524 |
| 2017/0080625 A1* | 3/2017 | Bast ................... B29C 49/36 |
| 2020/0254677 A1* | 8/2020 | Mayer ................. B29C 49/78 |

FOREIGN PATENT DOCUMENTS

| | | |
|---|---|---|
| JP | 2000043129 A | 2/2000 |
| KR | 1020120067942 A | 6/2012 |

OTHER PUBLICATIONS

International Search Report and Written Opinion issued in PCT/US2017/029629, dated Jan. 16, 2018; ISA/KR.

\* cited by examiner

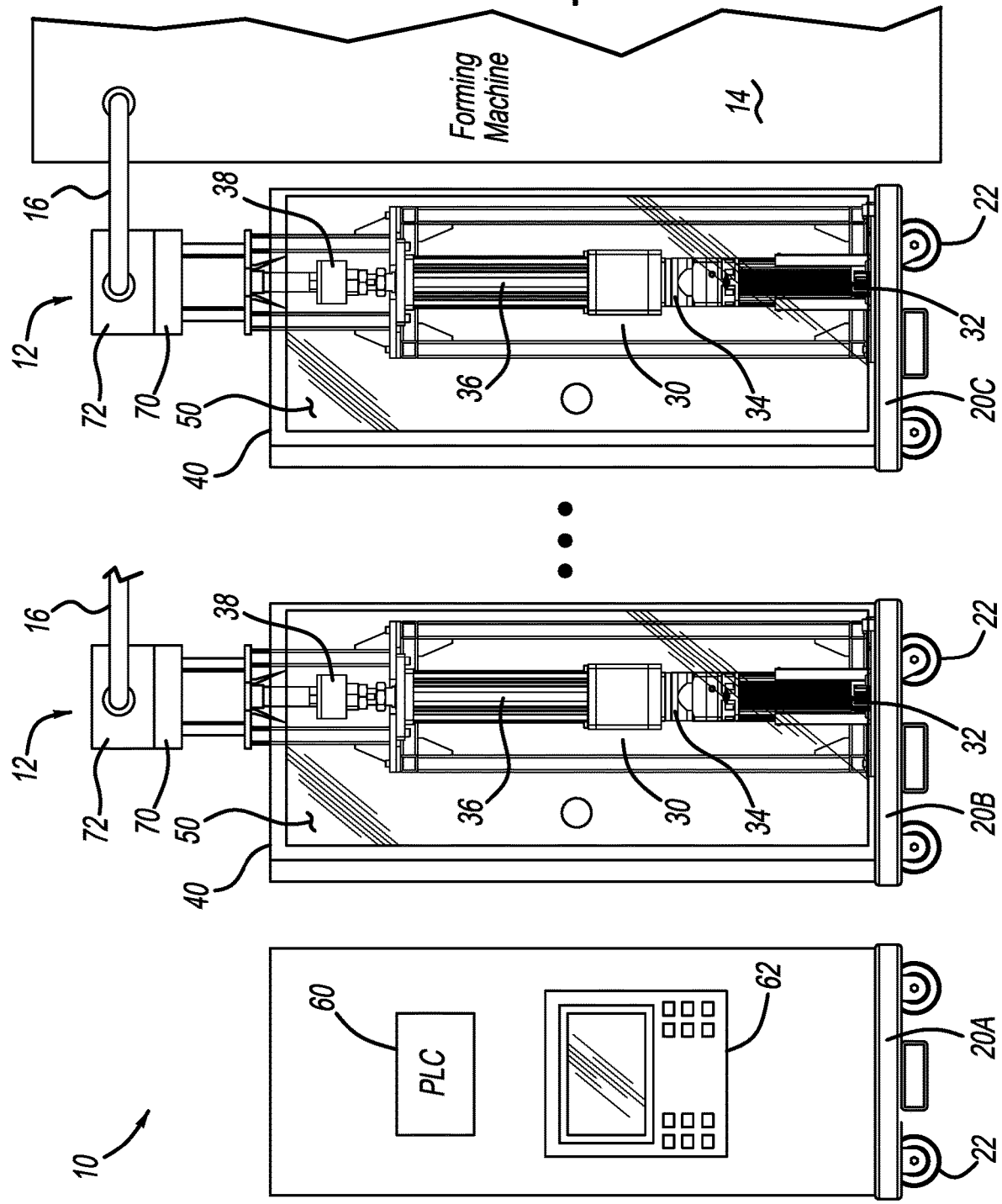

PORTABLE MODULE FOR CONTAINER FORMING AND FILLING SYSTEM

CROSS-REFERENCE TO RELATED APPLICATIONS

This application is a U.S. National Phase Application under 35 U.S.C. 371 of International Application No. PCT/US2017/029629 filed on Apr. 26, 2017, the entire disclosure of which is incorporated herein by reference.

FIELD

The present disclosure relates to a portable module for a container forming and filling system.

BACKGROUND

This section provides background information related to the present disclosure, which is not necessarily prior art.

As a result of environmental and other concerns, plastic containers, more specifically polyester and even more specifically polyethylene terephthalate (PET) containers are now being used more than ever to package numerous commodities previously supplied in glass containers. Manufacturers and fillers, as well as consumers, have recognized that PET containers are lightweight, inexpensive, recyclable and manufacturable in large quantities.

Plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container.

$$\% \text{ Crystallinity} = \left(\frac{\rho - \rho_a}{\rho_c - \rho_a}\right) \times 100$$

The following equation defines the percentage of crystallinity as a volume fraction:
where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching a molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable. Used after mechanical processing, however, thermal processing results in higher crystallinity and excellent clarity for those portions of the container having biaxial molecular orientation. The thermal processing of an oriented PET container, which is known as heat setting, typically includes molding a PET preform against a mold heated to a temperature of approximately 250° F.-350° F. (approximately 121° C.-177° C.), and holding the container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

Existing container forming and filling machines are suitable for their intended use, but are subject to improvement. For example, existing container forming and filling machines cannot be readily modified to accommodate different manufacturing requirements. Thus, a machine configured for blow molding cannot be readily modified for liquid forming and filling. The present teachings provide for an improved container forming and filling system that can be easily modified to accommodate different manufacturing requirements. The present teachings satisfy numerous long felt needs, provide numerous unexpected results, and provide for numerous additional advantages as set forth herein and as one skilled in the art will recognize.

SUMMARY

This section provides a general summary of the disclosure, and is not a comprehensive disclosure of its full scope or all of its features.

The present teachings provide for a portable module for a container forming and filling system. The portable module includes a control module, an operator interface, a pump assembly, connectors, sensors, fluid supply lines, a housing, a base and a transport member. The pump assembly is configured to pump liquid for forming the container and filling the container into a container forming and filling machine. The connectors are for connecting the portable module to the container forming and filling machine. The sensors are for detecting and monitoring the process of forming and filling. The fluid supply lines are for supplying the filling and forming fluid. The housing is an enclosure for the module components. The base is a platform for the module components to be mounted on. The transport member is for moving the portable module.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

FIG. 1C illustrates the system of FIG. 1A including multiple pump assemblies and a control module on separate bases;

and

Figure 1A:
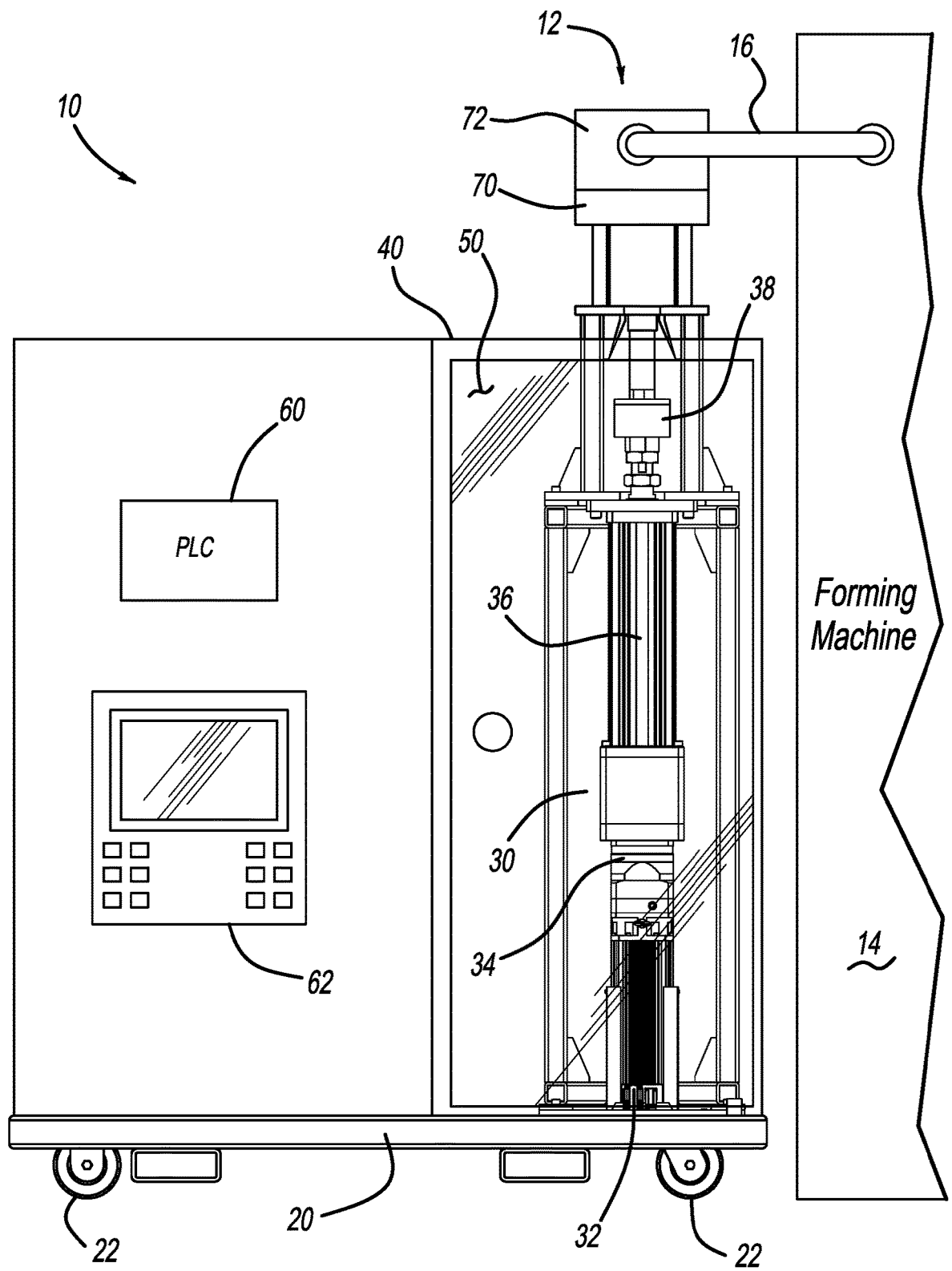
FIG. 1A illustrates a system according to the present teachings for liquid forming and filling a container.
Figure 4:
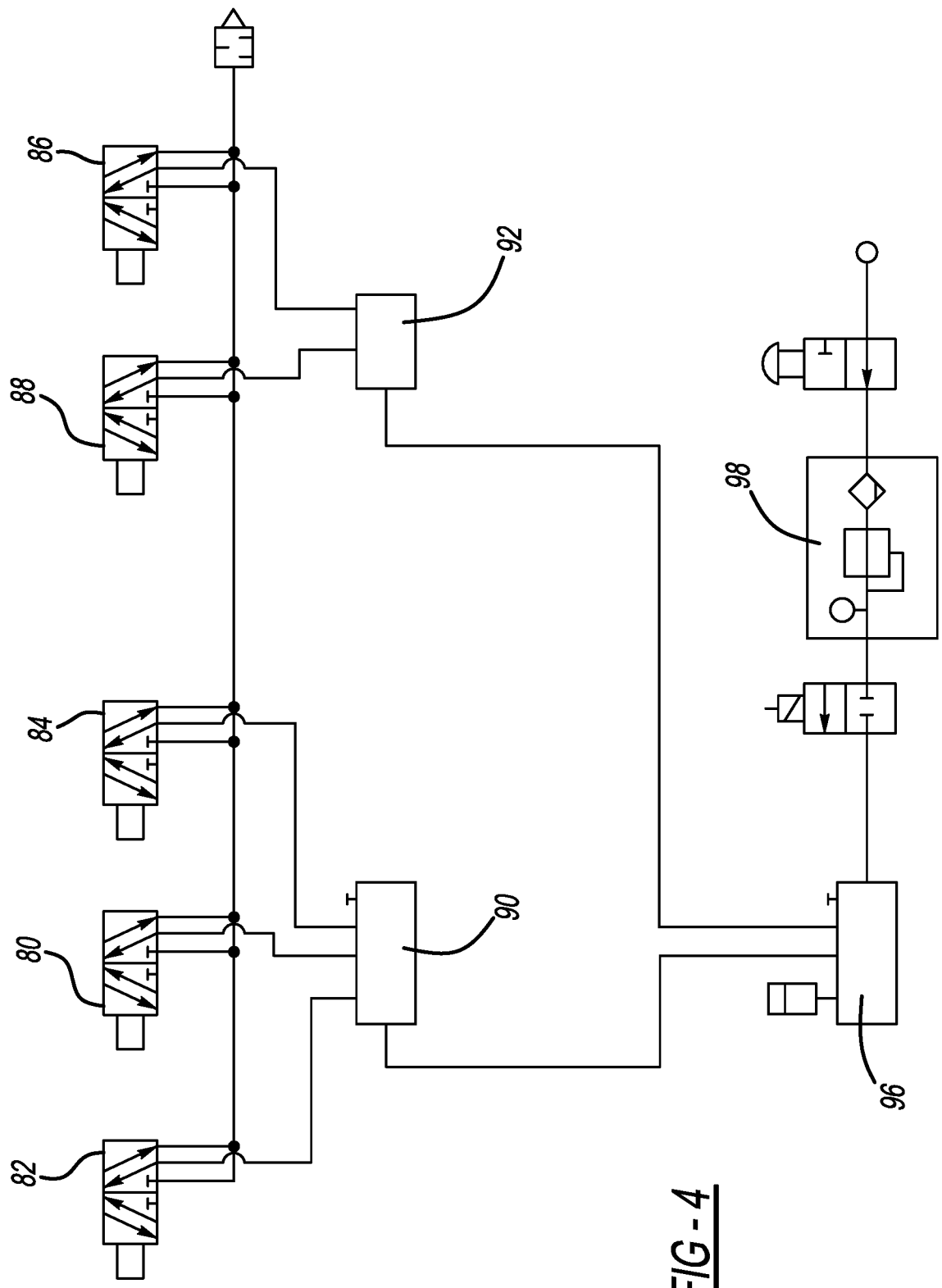

FIG. 4 is a diagram illustrating additional portions of the system of FIG. 1A.

Corresponding reference numerals indicate corresponding parts throughout the several views of the drawings.

DETAILED DESCRIPTION

Example embodiments will now be described more fully with reference to the accompanying drawings.

FIG. 1A illustrates a portable module 10 in accordance with the present teachings for a container forming and filling system 12. The portable module 10 can be connected to any suitable container forming and filling machine 14 with any suitable connectors 16. The container forming and filling machine 14 can be any suitable type of container forming and filling machine, such as a Liquiform® rotary form/fill machine, a modified rotary blow molder, a modified linear blow molder, or a modified one-step blow molder.

The connectors 16 can be any suitable fluid supply lines and connectors, recirculation lines and connectors, and any suitable connectors configured to relay control signals, control commands, power, and/or status data between the portable module 10 and the container forming/filling machine 14. For example, the connectors 16 can be include recirculation lines, venting lines, rapid decompression lines, pressure transducers, stretch rod and seal pin position sensors, etc. The connectors 16 can also include any suitable air lines and power lines.

The portable module 10 includes any suitable base 20A that is portable to allow the portable module 10 to be moved and connected to various different container/forming filling machines 14. To facilitate portability of the portable module 10, the portable module 10 can include any suitable transport members 22. In the example illustrated in FIG. 1A, the transport members 22 can include a plurality of wheels mounted to the base 20A. The portable module 10 can thus advantageously be wheeled by one or more persons to any suitable container forming/filling machine 14 for connection thereto by way of connectors 16. The portable module 10 can also be moved by any suitable mechanical means, such as a fork truck or crane.

Figure 2:
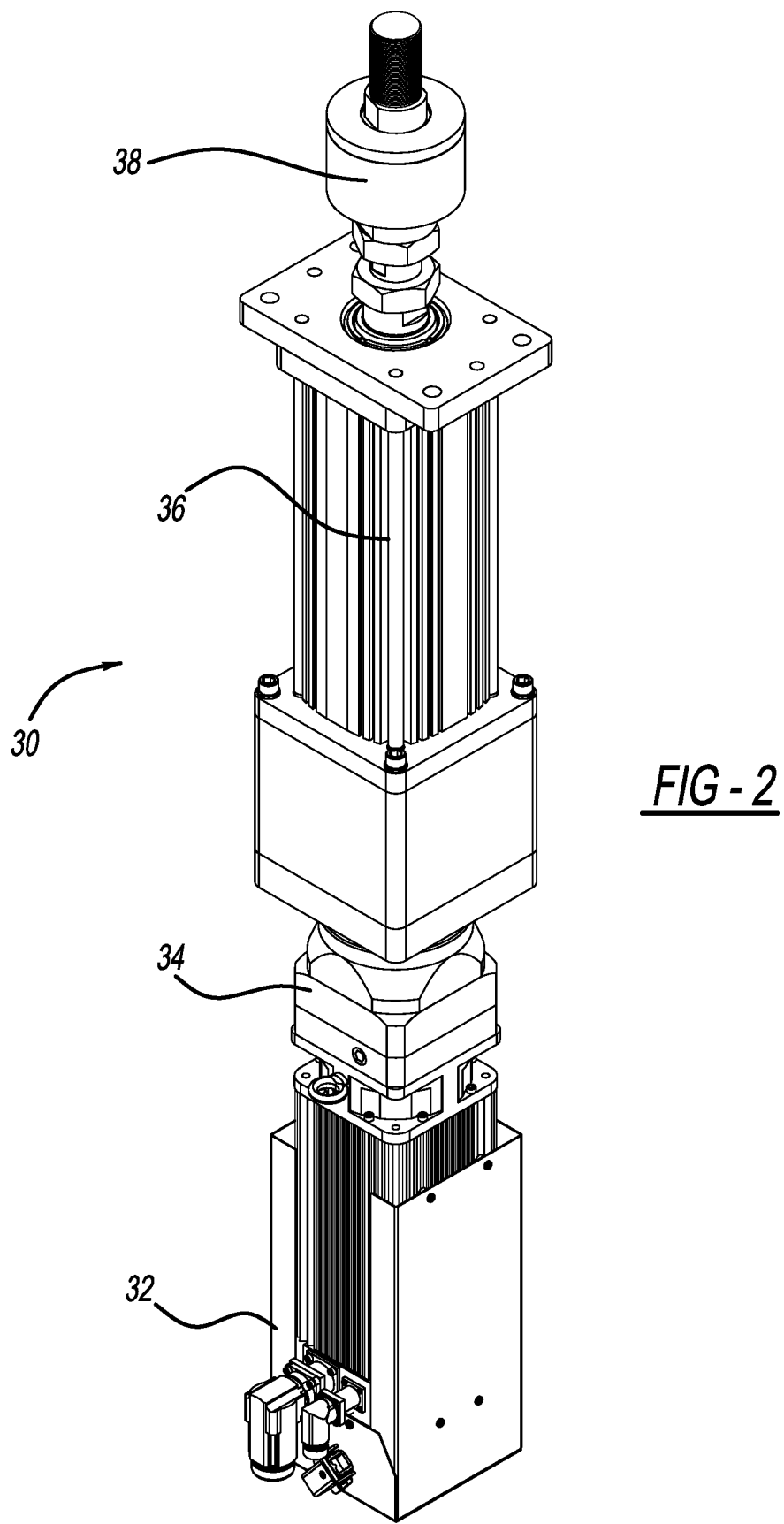
FIG. 2 is a perspective view of a cylinder assembly of the system of FIG. 1A.

With continued reference to FIG. 1A and additional reference to FIG. 2, seated on the base 20A, either directly or indirectly, is a pump assembly 30. The pump assembly 30 is generally configured to pump liquid to the container forming/filling machine 14 for forming a container from a preform, and filling the container with any suitable liquid, such as water or any other suitable beverage. The pump assembly 30 can be any suitable hydraulic, pneumatic or electric drive system. One embodiment generally includes a servo motor 32, which rotates a shaft for rotating gears of a gear box 34. The gears of the gear box 34 rotate a linear ball or roller screw 36. The ball or roller screw 36 actuates couplings 38. With additional reference to FIG. 3, the couplings 38 actuate cylinder 70. Mounted to the cylinder 70 is a cylinder manifold cap 72. The pump assembly 30 can be connected to at least one cavity of any suitable forming and filling machine 14.

As illustrated in FIG. 1A, the portable module 10 further includes a housing 40. The housing 40 can house any suitable components of the portable module 10, such as the servo motor 32, the gear box 34, the ball or roller screw 36, and the couplings 38. The housing 40 may include a door 50 to permit access to the components within the housing 40.

The portable module 10 further includes a programmable logic control (PLC) module 60 (see FIG. 1A). The control module 60 is configured to control components of the portable module 10, and can be configured to control any suitable components of the container forming/filling module 14 by way of the connectors 16. In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware. The code is configured to provide the features of the portable module 10, and optionally the forming machine 14. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 1B:
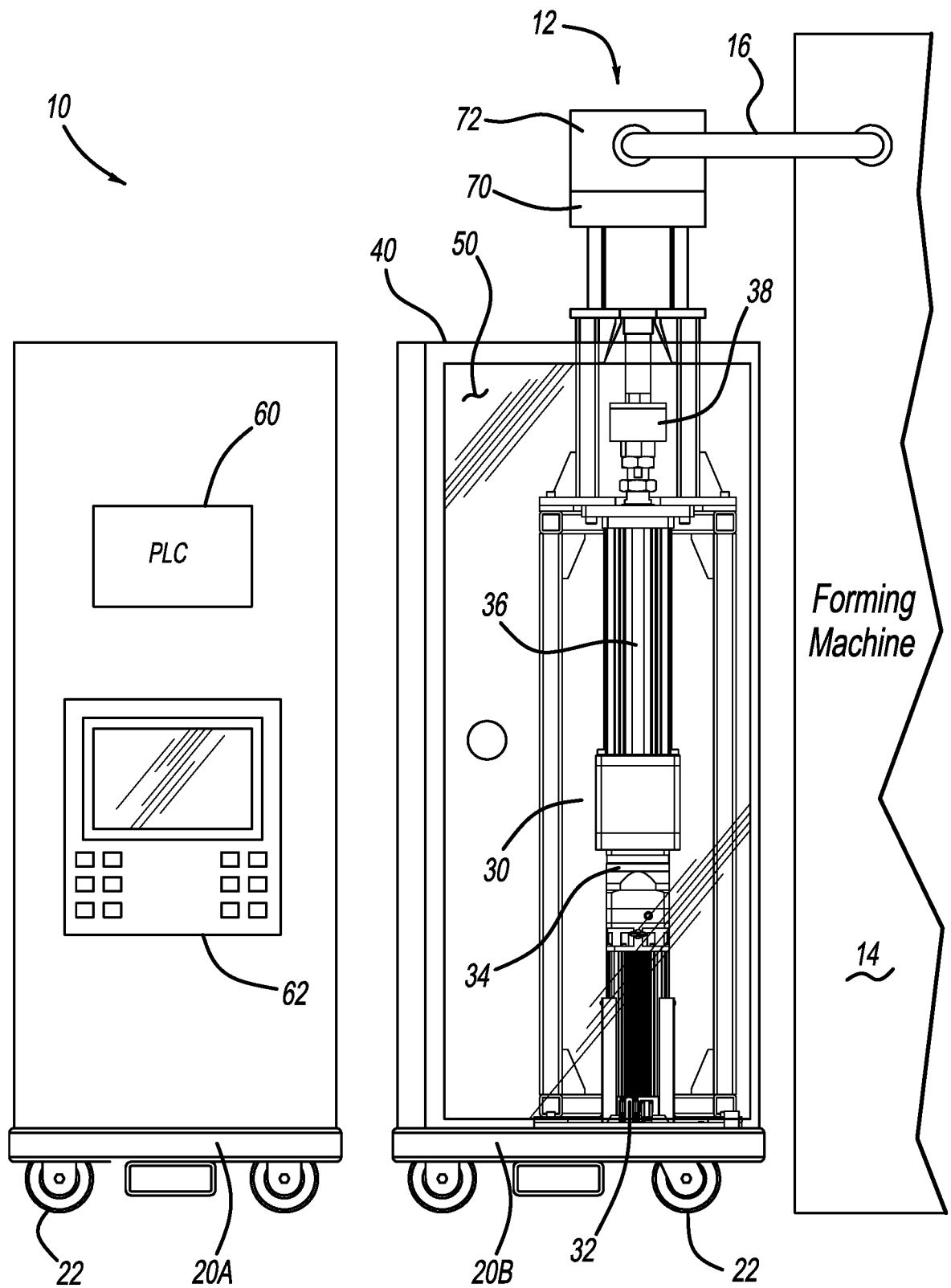
FIG. 1B illustrates the system of FIG. 1A with a pump assembly and control module on separate bases.

The portable module 10 further includes any suitable machine-man interface (MMI) 62, through which the PLC module 60 can be accessed and the components of the portable module 10 and the container forming/filling machine 14 can be controlled. The MMI 62 can be any suitable interface, such as a keypad, display, touch screen, touch pad, etc. The PLC module 60 and MMI 62 can be located on the same base 20A as the pump assembly 30 as shown in FIG. 1A, or the PLC module 60 and MMI 62 can be located on separate bases 20A and 20B as shown in FIG. 1B. The PLC module 60 and MMI 62 can also be connected to a plurality of pump assemblies 30 located on separate bases 20A, 20B, 20C as shown in FIG. 1C.

With continued reference to FIGS. 1A-1C and 2, and additional reference to FIG. 3, additional features of the portable module 10 and the container forming/filling machine 14 will now be described. The portable module 10 includes various fluid lines 74 configured to direct the flow of fluid for forming and filling any number of containers throughout the portable module 10. A number of the fluid lines 74 flow to and from the cylinder cap 72 of the cylinder 70. Arranged along the fluid lines 74 are various valves, which may include any number of the following: cylinder vent valve 80; cavity forming valves 82 and 84; supply valve 86; balance tank valve 88; and pressure relief valve 94. FIG. 4 illustrates an air valve circuit and components associated therewith for controlling the valves 80-88. Specifically, an air manifold 90 controls airflow to the valves 80, 82, and 84. Another air manifold 92 controls airflow to the valves 86 and 88. Air manifold 96 controls airflow to each of the air manifolds 90 and 92. A supply air regulator filter 98, such as a Wilkerson supply air regulator filter, can be arranged adjacent to the air manifold 96. The features of FIG. 4 are included with the portable module 10.

The fluid for filling and forming the containers can be supplied from a fluid source 110 such as a tank, pump, or kettle. The fluid source 110 may be included with the portable module 10. Alternatively, the fluid source 110 may be located remote to the portable module 10, and connected to the portable module 10 by way of connectors 16.

Arranged between the fluid source 110 and the supply valve 86 is a temperature gauge 112 for measuring the temperature of fluid flowing from the fluid source 110. Arranged downstream from the balance tank valve 88 is a balance tank 120 and an air vent 122. The balance tank 120 can be included with the portable module 10, or located remote to the portable module 10. When the balance tank 120 is located remote to the portable module 10, the balance tank 120 can be connected to the portable module 10 with a line 74, and any suitable one of the connectors 16.

Figure 3:
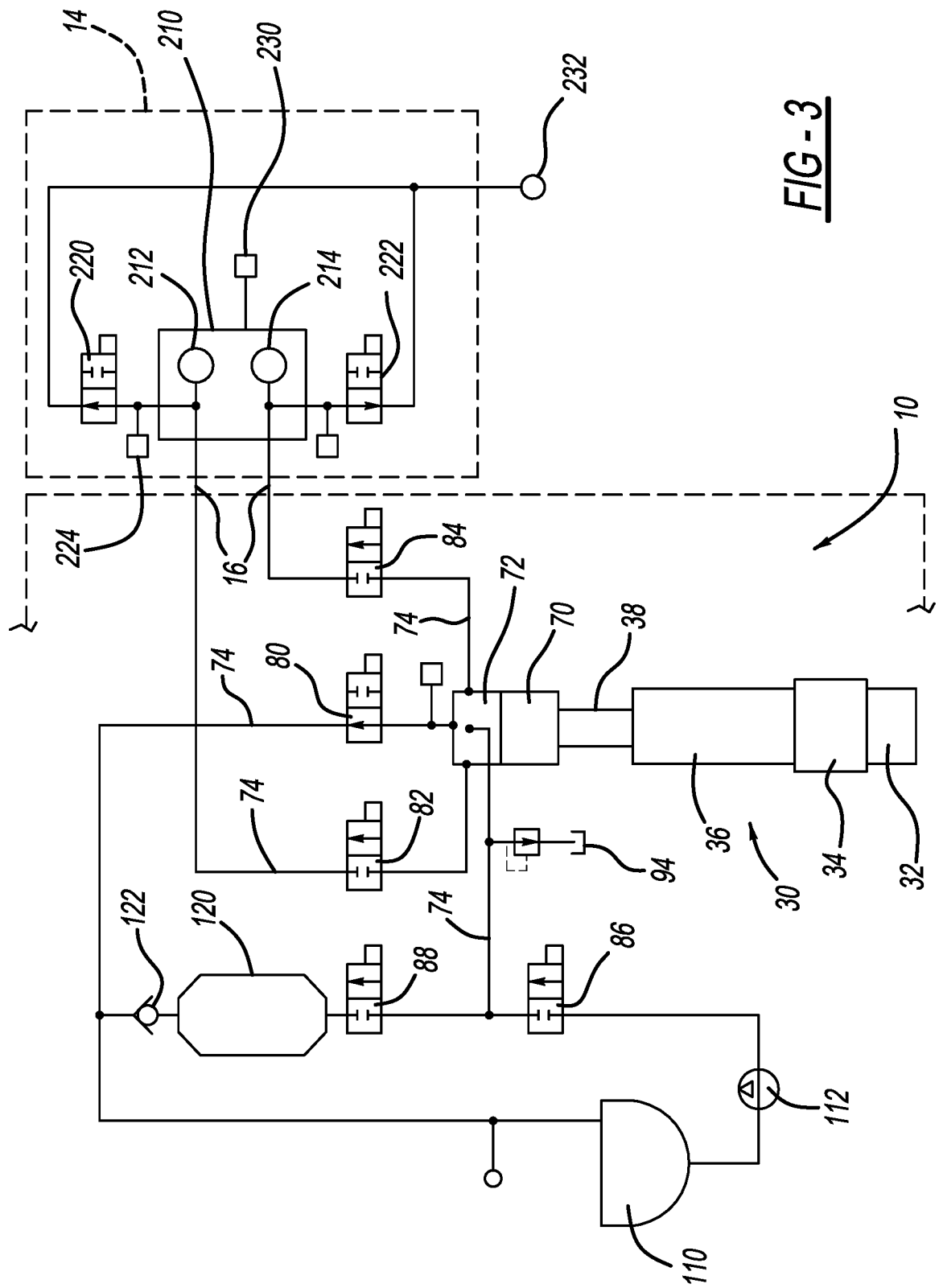
FIG. 3 is a diagram illustrating portions of the system of FIG. 1A.

With reference to FIG. 3, the container forming/filling machine 14 generally includes any number of forming heads 210 defining any number of cavities 212 and 214. Recirculation valves 220 and 222 can also be included. Pressure sensor 224 measures pressure upstream of the recirculation valve 220. Laser sensor 230 may also be included. The laser sensor 230 is configured to detect position of seal pins of the forming heads 210. Recirculation lines and connectors 232 provide return lines from the forming machine 14 to the source 110. The machine 14 can further include stretch rods, as well as any other components used with a typical container forming machine.

The present teachings thus advantageously provide for the portable module 10, which can be easily moved, such as with the assistance of transport member 22, to any suitable type of container forming and filling machines 14. The portable module 10 can be connected to the container forming and filing machine 14 with any suitable connectors 16. The connectors 16 include at least supply lines and connectors, recirculation lines and connectors, airlines, power lines, and connectors suitable for relaying control signals between the portable module 10 and the container forming/filling machine 14, such as recirculation, venting, rapid decompression, pressure transducers, and readings from stretch rod and seal pin position sensors. The portable module 10 supplies the liquid to the container forming/filling machine 14 in order to form and fill any suitable containers. The containers are typically formed from a preform. The liquid is directed to the preform from the portable module 10, in a manner sufficient to form the container. Once the fluid from the portable module 10 simultaneously fills the container with the fluid, which can be water or any other suitable beverage, the portable module 10 can be decoupled and then coupled to another container forming/filling machine 14 used for liquid forming and filling, as well as machines 14 that typically form containers by blow molding. Thus the portable module 10 can advantageously convert blow molding machines 14 into liquid forming machines 14.

The module 10 is advantageously self-contained to hold most of the forming and filling components, and thus only minimal modifications and connections to the machine 14 need be made. The module 10 is particularly suitable for either prototyping or high volume production runs. The advantages of the portable module 10 include portability and flexibility since the module 10 can be quickly disconnected and reconnected to different container forming and filling machines 14 based on manufacturing requirements. The module 10 also requires minimal modifications to the machine 14 to enable the machine 14 to adapt to the module 10. For example, a machine 14 configured for blow molding can be easily modified into a liquid forming and filling machine 14 capable of being controlled by the module 10, and specifically the PLC module 60, and by an operator using the MMI 62.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A portable system for a container forming and filling machine configured to form a container from a preform, the portable module comprising:
   a control module configured to operate the container forming and filling machine to inject liquid into the preform to stretch the preform and form the container from the preform, and simultaneously fill the container with the liquid;
   an operator interface configured for operation of the container forming and filling machine;
   a mobile control base to which the control module and the operator interface are mounted, the mobile control base including transport members for moving the mobile control base to different locations;
   a plurality of pump assemblies, each one of the plurality of pump assemblies mounted to a different mobile pump base including transport members;
   control connectors connecting the control module to each one of the plurality of pump assemblies and the container forming and filling machine for relaying control signals between the control module and the container forming and filling machine;
   fluid supply lines connecting each one of the plurality of pump assemblies to the container forming and filling machine;
   wherein the control module is configured to communicate with, and operate, the plurality of pump assemblies and the container forming and filling machine by way of the control connectors to simultaneously form the container from the preform and fill the container with the liquid.

2. The portable system of claim 1, further comprising a temperature gauge.

3. The portable system of claim 1, wherein the portable system further includes a fluid source.

4. The portable system of claim 1, wherein the portable system further includes a balance tank.

5. The portable system of claim 1, wherein the control connectors connect the control module to forming heads of the container forming and filling machine.

6. The portable system of claim 1, wherein the control connectors connect the control module to forming heads of the container forming and filling machine including seal pins and laser sensors for detecting the seal pins.

7. The portable system of claim 1, wherein each one of the plurality of pump assemblies is connected to at least one cavity of the container forming and filling machine.

8. The portable system of claim 1, wherein each one of the plurality of pump assemblies includes a gear box operably coupled to a motor, the gear box configured to receive a driving output from the motor and output a gear box driving force;
   a linear roller screw operably coupled to the gear box, the linear roller screw configured to produce linear movement in response to rotational movement from the gear box; and
   a forming cylinder for filling the container;
   wherein the gear box, the motor, the linear roller screw, and the forming cylinder are mounted to the mobile pump base.

9. The portable system of claim 8, further comprising couplings connecting the linear roller screw to the forming cylinder.

10. The portable system of claim 8, further comprising a cylinder manifold cap for the cylinder.

11. The portable system of claim 1, further comprising a plurality of valves, and a valve control circuit for controlling the plurality of valves.

12. The portable system of claim 11, wherein the plurality of valves includes: a supply valve; a cylinder vent valve; a first forming valve; a second forming valve; a first recirculation valve; a second recirculation valve; a balance tank valve; and a pressure relief valve.

13. The portable system of claim 11, wherein the valve control circuit includes air manifolds and an air supply regulator.

* * * * *